| (12) | United States Patent | (10) Patent No.: | US 11,239,894 B2 |
|---|---|---|---|
| | Wang et al. | (45) Date of Patent: | *Feb. 1, 2022 |

(54) GENERIC RECIPROCITY BASED CHANNEL STATE INFORMATION ACQUISITION FRAMEWORKS FOR ADVANCED NETWORKS

(71) Applicant: AT&T Intellectual Property I, L.P., Atlanta, GA (US)

(72) Inventors: Xiaoyi Wang, Austin, TX (US); Arunabha Ghosh, Austin, TX (US); SaiRamesh Nammi, Austin, TX (US); Salam Akoum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,290

(22) Filed: Mar. 26, 2020

(65) Prior Publication Data

US 2020/0228179 A1 Jul. 16, 2020

Related U.S. Application Data

(63) Continuation of application No. 16/059,745, filed on Aug. 9, 2018, now Pat. No. 10,637,551.

(51) Int. Cl.
*H04B 7/06* (2006.01)
*H04B 17/373* (2015.01)
(Continued)

(52) U.S. Cl.
CPC ........... *H04B 7/0626* (2013.01); *G06N 20/00* (2019.01); *H04B 17/373* (2015.01); *H04W 4/06* (2013.01); *H04W 24/02* (2013.01)

(58) Field of Classification Search
CPC .... H04B 7/0626; H04B 17/373; G06N 20/00; H04W 4/06; H04W 24/02
(Continued)

(56) References Cited

U.S. PATENT DOCUMENTS

| 8,923,148 B2 | 12/2014 | Cheng et al. |
| 9,247,557 B2 | 1/2016 | Liao et al. |

(Continued)

FOREIGN PATENT DOCUMENTS

WO 2017/140344 A1 8/2017

OTHER PUBLICATIONS

Notice of Allowance received for U.S. Appl. No. 16/059,745 dated Dec. 27, 2019, 23 pages.

*Primary Examiner* — Faisal Choudhury
(74) *Attorney, Agent, or Firm* — Amin, Turocy & Watson, LLP

(57) ABSTRACT

Facilitating generic reciprocity-based channel state information acquisition frameworks for advanced networks (e.g., 4G, 5G, and beyond) is provided herein. Operations of a system can comprise determining first uplink channel state information for a first mobile device based on first downlink channel state information received from the first mobile device. The first mobile device can be from a group of mobile devices in a wireless communications network. The operations can also comprise training a model on a difference between the first downlink channel state information and the first uplink channel state information to a defined level of confidence. Further, the operations can comprise employing the model to determine, without receipt of second downlink channel state information from a second mobile device of the group of mobile devices, second uplink channel state information for the second mobile device.

20 Claims, 10 Drawing Sheets

(51) Int. Cl.
 *H04W 24/02* (2009.01)
 *H04W 4/06* (2009.01)
 *G06N 20/00* (2019.01)

(58) Field of Classification Search
 USPC .......................................................... 370/252
 See application file for complete search history.

(56) References Cited

U.S. PATENT DOCUMENTS

| | | | |
|---|---|---|---|
| 10,735,057 B1* | 8/2020 | Zhao | H04W 72/0446 |
| 2007/0064823 A1* | 3/2007 | Hwang | H04B 17/24 |
| | | | 375/260 |
| 2011/0199946 A1 | 8/2011 | Breit et al. | |
| 2015/0280797 A1 | 10/2015 | Li | |
| 2018/0006699 A1 | 1/2018 | Enescu et al. | |
| 2018/0019899 A1* | 1/2018 | Kuchi | H04L 5/0026 |
| 2018/0048492 A1 | 2/2018 | Kundargi et al. | |
| 2018/0091207 A1 | 3/2018 | Kakishima et al. | |
| 2018/0097667 A1 | 4/2018 | Too et al. | |
| 2018/0123657 A1 | 5/2018 | Kundargi et al. | |
| 2018/0167183 A1 | 6/2018 | Zhang et al. | |
| 2018/0191527 A1 | 7/2018 | Zhu et al. | |

\* cited by examiner

GENERIC RECIPROCITY BASED CHANNEL STATE INFORMATION ACQUISITION FRAMEWORKS FOR ADVANCED NETWORKS

RELATED APPLICATION

The subject patent application is a continuation of, and claims priority to, U.S. patent application Ser. No. 16/059,745 (now U.S. Pat. No. 10,637,551), filed Aug. 9, 2018, and entitled "GENERIC RECIPROCITY BASED CHANNEL STATE INFORMATION ACQUISITION FRAMEWORKS FOR ADVANCED NETWORKS," the entirety of which application is hereby expressly incorporated by reference herein.

TECHNICAL FIELD

This disclosure relates generally to the field of mobile communication and, more specifically, to channel state information acquisition frameworks in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
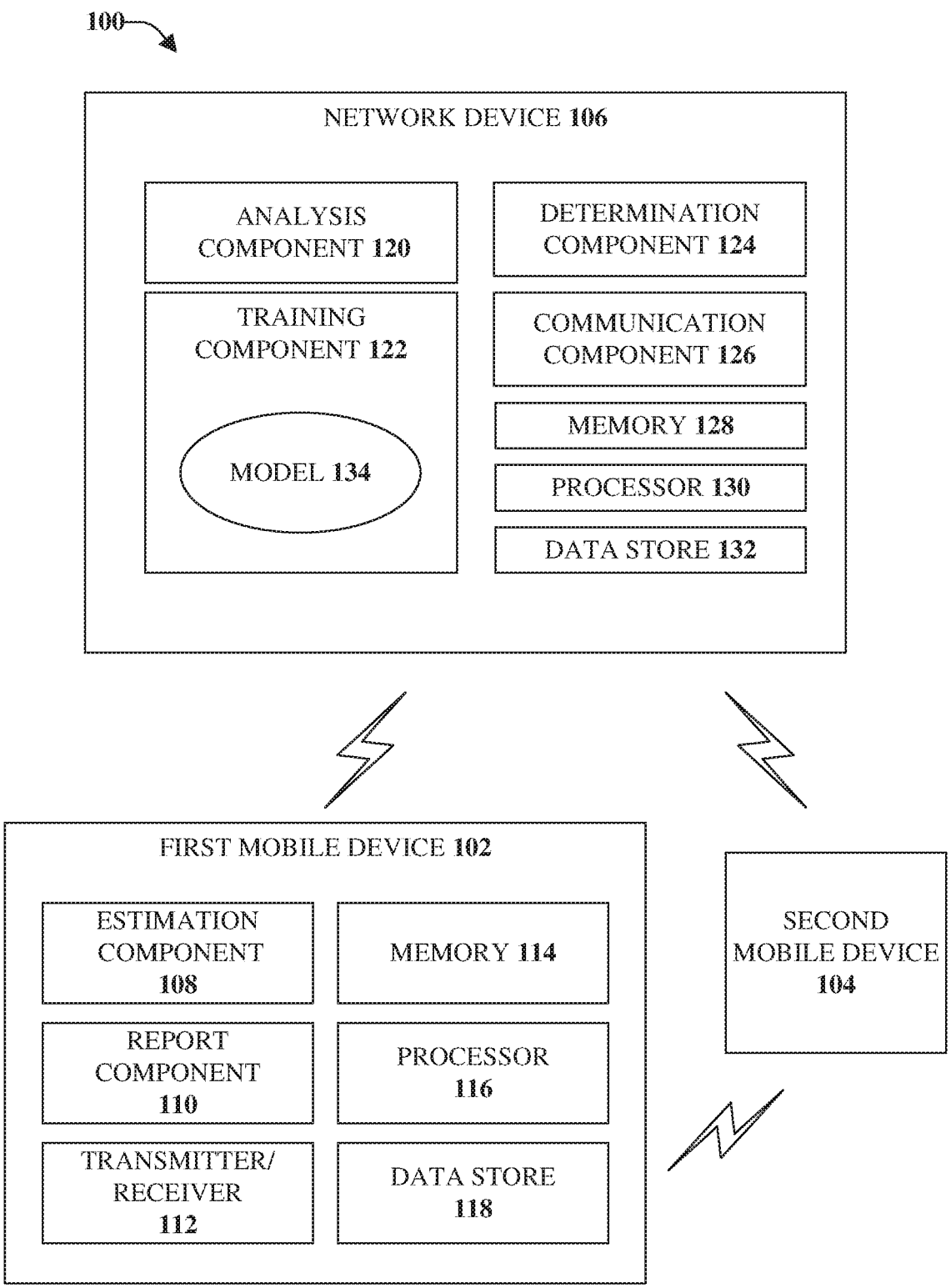
FIG. 1 illustrates an example, non-limiting, communications system for facilitating generic reciprocity-based channel state information acquisition frameworks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate generic reciprocity-based channel state information acquisition frameworks for advanced networks. In one embodiment, described herein is a system that can comprise a processor and a memory that stores executable instructions that, when executed by the processor, facilitate performance of operations. The operations can comprise determining first uplink channel state information for a first mobile device based on first downlink channel state information received from the first mobile device. The first mobile device can be from a group of mobile devices in a wireless communications network. The operations can also comprise training a model on a difference between the first downlink channel state information and the first uplink channel state information to a defined level of confidence. Further, the operations can comprise employing the model to determine, without receipt of second downlink channel state information from a second mobile device of the group of mobile devices, second uplink channel state information for the second mobile device.

In an example, the operations can comprise comparing the first downlink channel state information and the first uplink channel state information during an over-the-air calibration process. Further to this example, the first downlink channel state information can comprise a first reported pre-coding matrix indicator. In addition, the first uplink channel state information can comprise a first computed pre-coding matrix indicator.

According to some examples, the operations can comprise employing the model to determine third uplink channel state information for a third mobile device. Further to these examples, a third downlink channel state information is not received from the third mobile device.

In accordance with some implementations, training the model can comprise generating a data store that comprises a mapping relationship between the first downlink channel state information and the first uplink channel state information.

According to some implementations, determining the first uplink channel state information can comprise quantizing the first uplink channel state information based on a codebook utilized by the first mobile device to determine the first downlink channel state information.

In accordance with some implementations, determining first uplink channel state information can comprise estimating a spatial domain portion of the channel comprising a main signal transmitting angle. In additional, or alternative, implementations, determining first uplink channel state information can comprise estimating a spatial domain portion of the channel comprising a main signal receiving angle.

The operations can also comprise, according to some implementations, determining third uplink channel state information for the first mobile device based on third downlink channel state information received from the first mobile device. The operations can also comprise populating a data store with a one-to-one mapping relationship between the first uplink channel state information and the first downlink channel state information, and between the third uplink channel state information and the third downlink channel state information.

Training the model can comprise utilizing machine learning for evaluation of a first difference between the first downlink channel state information and the first uplink channel state information according to various implementations.

In some implementations, the first downlink channel state information can comprise a reported pre-coding matrix indicator. The first uplink channel state information can comprise a determined pre-coding matrix indicator. Further, training the model can comprise comparing the reported pre-coding matrix indicator and the determined pre-coding matrix indicator.

According to some implementations, the first downlink channel state information can be received via an uplink feedback channel According to other implementations, the first downlink channel state information can be received via a data traffic channel.

Another embodiment relates to a method that can comprise, based on first reported downlink channel state information received from a first mobile device of a group of mobile devices in a wireless network, facilitating, by a network device of the wireless network and comprising a processor, a determination of first uplink channel state information for the first mobile device. The method can also comprise populating, by the network device, a data store that comprises respective differences between the first uplink channel state information and the first reported downlink channel state information. The network device can train a model on the respective differences in the data store. The model can be trained to detect the respective differences to a defined level of confidence. Further, the method can comprise utilizing, by the network device, the model to determine second uplink channel state information for a second mobile device of the group of mobile devices. Second reported downlink channel state information is not received from the second mobile device.

In an example, training the model can comprise utilizing machine learning to train the model on the respective differences between the first uplink channel state information and the first reported downlink channel state information.

According to some implementations, prior to populating the data store, the method can comprise determining, by the network device, the respective differences during an over-the-air calibration process.

In some implementations, populating the data store can comprise facilitating a one-to-one mapping relationship between the first uplink channel state information and the first reported downlink channel state information based on the respective differences. According to some implementations, utilizing the model to determine the second uplink channel state information for the second mobile device can comprise facilitating a mitigation of an amount of network traffic within the wireless network as compared to the second mobile device providing the second reported downlink channel state information.

Yet another embodiment relates to a machine-readable storage medium, comprising executable instructions that, when executed by a processor, facilitate performance of operations. The operations can comprise determining, for a first mobile device from a group of mobile devices in a wireless network, first uplink channel state information based on first downlink channel state information received from the first mobile device. The operations can also comprise populating a data store with information indicative of differences between the first downlink channel state information and the first uplink channel state information and training a model on the information indicative of the differences to a defined confidence level. Further, the operations can comprise determining, for a second mobile device in the group of mobile devices, second uplink channel state information based on the model. Second downlink channel state information is not received from the second mobile device.

According to some implementations, the operations can also comprise implementing machine learning to train the model on the information indicative of differences between the first downlink channel state information and the first uplink channel state information. Further, the operations can comprise utilizing the model for determining the second uplink channel state information.

Populating the data store can comprise, according to some implementations, storing the first uplink channel state information, the first downlink channel state information, and the information indicative of differences in the data store as a one-to-one mapping relationship.

In accordance with some implementations, determining the first uplink channel state information can comprise quantizing the first uplink channel state information based on a codebook utilized by the first mobile device to determine the first downlink channel state information.

To meet the huge demand for data centric applications, 3GPP is currently discussing to extend the current 4G standards to 5G also called New Radio (NR) access. Massive Multiple Input, Multiple Output (MIMO) is a technology that enables NR to have better spectrum efficiency over an LTE system. To fully utilize the MIMO potentials, a large number of antenna ports (e.g., up to around thirty-two ports) have been defined. Based on information theory, with the large number of antenna ports, a large CSI feedback overhead is needed. An effective way to reduce feedback overhead is to utilize reciprocity in the radio channel Reciprocity procedures have been extensively studied in Time Division Duplexing (TDD) systems. In Frequency Division Duplexing (FDD) systems, the downlink and uplink are using different frequency bands. Therefore, it cannot simply be assumed that the whole channel responses are reciprocal.

The conventional CSI feedback framework is based on feedback from the User Equipment (UE) or mobile device. For example, type 2 CSI feedback is based on a linear combination with sub-band phase and amplitude adjustment for each selected beam. The feedback overhead can easily reach over 100 bits per report. That imposes a huge challenge on the uplink feedback channel design. On the other hand, CRI based feedback allows the UE to select one out of several precoded CSI-RS resource each represents a beam. But how the base-station obtain the precoder for the CSI-RS resource is unknown. So, effectively, in an FDD system, there is no other choice than having a large number of feedback bits to obtain the fine granular CSI at the gNB (e.g., network device) side.

The various aspects provided herein relate to facilitating generic reciprocity-based channel state information acquisition frameworks. Provided is an FDD reciprocity CSI process procedure. According to some aspects, a database can be constructed to track the downlink and uplink CSI difference. The database construction can be based on an over-the-air calibration process, which can compare the reported CSI and uplink CSI.

Referring initially to FIG. 1, illustrated is an example, non-limiting, communications system 100 for facilitating generic reciprocity-based channel state information acquisition frameworks in accordance with one or more embodiments described herein.

The communications system 100 can comprise a first mobile device 102, at least a second mobile device 104, and a network device 106. The network device 106 can be included in a group of network devices of a wireless network. Although only two mobile devices and a single network device are shown and described, the various aspects are not limited to this implementation. Instead, multiple communication devices and/or multiple network devices can be included in a communications system.

The first mobile device 102 can include an estimation component 108, a report component 110, a transmitter/receiver 112, at least one memory 114, at least one processor 116, and at least one data store 118. The network device 106 can include an analysis component 120, a training component 122, determination component 124, a communications component 126, at least one memory 128, at least one processor 130, and at least one data store 132. Although not illustrated or described for purposes of simplicity, the second mobile device 104 can include similar components and functionality as the first mobile device 102.

The estimation component 108 can determine channel state information (CSI) of a downlink channel. The CSI can be included in a report (e.g., a CSI report) generated by the report component 110. Information that can be included in the report can include, but are not limited to, one or more CSI Resource Indicators (CRIs), one or more Rank Indicators (RIs), one or more Precoding Matrix Indicators (PMI), one or more LIs, and/or one or more Channel Quality Indicators (CQIs). The CSI report can be transmitted to the network device 106 as first downlink CSI via the transmitter/receiver 112.

The analysis component 120 can be configured to determine first uplink channel state information for the first mobile device 102 based on first downlink channel state information received from the first mobile device 102. The first mobile device 102 can be from a group of mobile devices in a wireless communications network. For example, the group of mobile devices can include the first mobile device 102, the second mobile device 104, and other mobile devices (not illustrated). Thus, in the example illustrated in FIG. 1, the first mobile device 102 can be selected to provide the downlink channel state information. However, according to some implementations, more than one mobile device, but less than all mobile devices, can be selected to provide the downlink channel state information. For example, two or more mobile devices can be selected to provide the downlink channel state information.

According to some implementations, the analysis component 120 can determine first uplink channel state information based on estimating a spatial domain portion of the channel comprising a main signal transmitting angle or beam. In additional and/or alternative implementations, the analysis component 120 can determine first uplink channel state information based on estimating a spatial domain portion of the channel comprising a main signal receiving angle and/or beam. For example, further to these implementations, the CSI can be in the format an arrival angle and/or an arrival beam.

The training component 122 can be configured to train a model 134 on a difference between the first downlink channel state information and the first uplink channel state information. The training component 122 can train the model to a defined level of confidence. The confidence level can be defined based on an acceptable amount of inaccuracy associated with uplink channel state information for mobile devices within the communications network.

The determination component 124 can employ the model 134 to determine second uplink channel state information for the second mobile device 104. The determination by the determination component 124 can be performed without receipt of second downlink channel state information from the second mobile device 104. According to implementations where two or more mobile devices are selected to provide the downlink channel state information, the model 134 can be utilized to determine uplink channel state information for mobile devices in the communications network, other than the two or more mobile devices.

The transmitter/receiver 112 (and/or the communications component 126) can be configured to transmit to, and/or receive data from, the network device 106 (or the first mobile device 102), other network devices, and/or other communication devices (e.g., the second mobile device 104). Through the transmitter/receiver 112 (and/or the communications component 126), the first mobile device 102 (and/or the network device 106) can concurrently transmit and receive data, can transmit and receive data at different times, or combinations thereof. According to some implementations, the transmitter/receiver 112 (and/or the communications component 126) can facilitate communications between an identified entity associated with the first mobile device 102 (e.g., an owner of the first mobile device 102, a user of the first mobile device 102, and so on). Further, the transmitter/receiver 112 (and/or the communications component 126) can be configured to receive, from the network device 106 or other network devices, multimedia content as discussed herein.

The at least one memory 114 can be operatively connected to the at least one processor 116. Further, the at least one memory 128 can be operatively connected to the at least one processor 130. The memories (e.g., the at least one memory 114, the at least one memory 128) can store executable instructions that, when executed by the processors (e.g., the at least one processor 116, the at least one processor 130) can facilitate performance of operations. Further, the processors can be utilized to execute computer executable components stored in the memories.

For example, the memories can store protocols associated with facilitating generic feedback to enable reciprocity and over the air calibration as discussed herein. Further, the memories can facilitate action to control communication between the first mobile device 102 and the network device 106 such that the communications system 100 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 106) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 2:
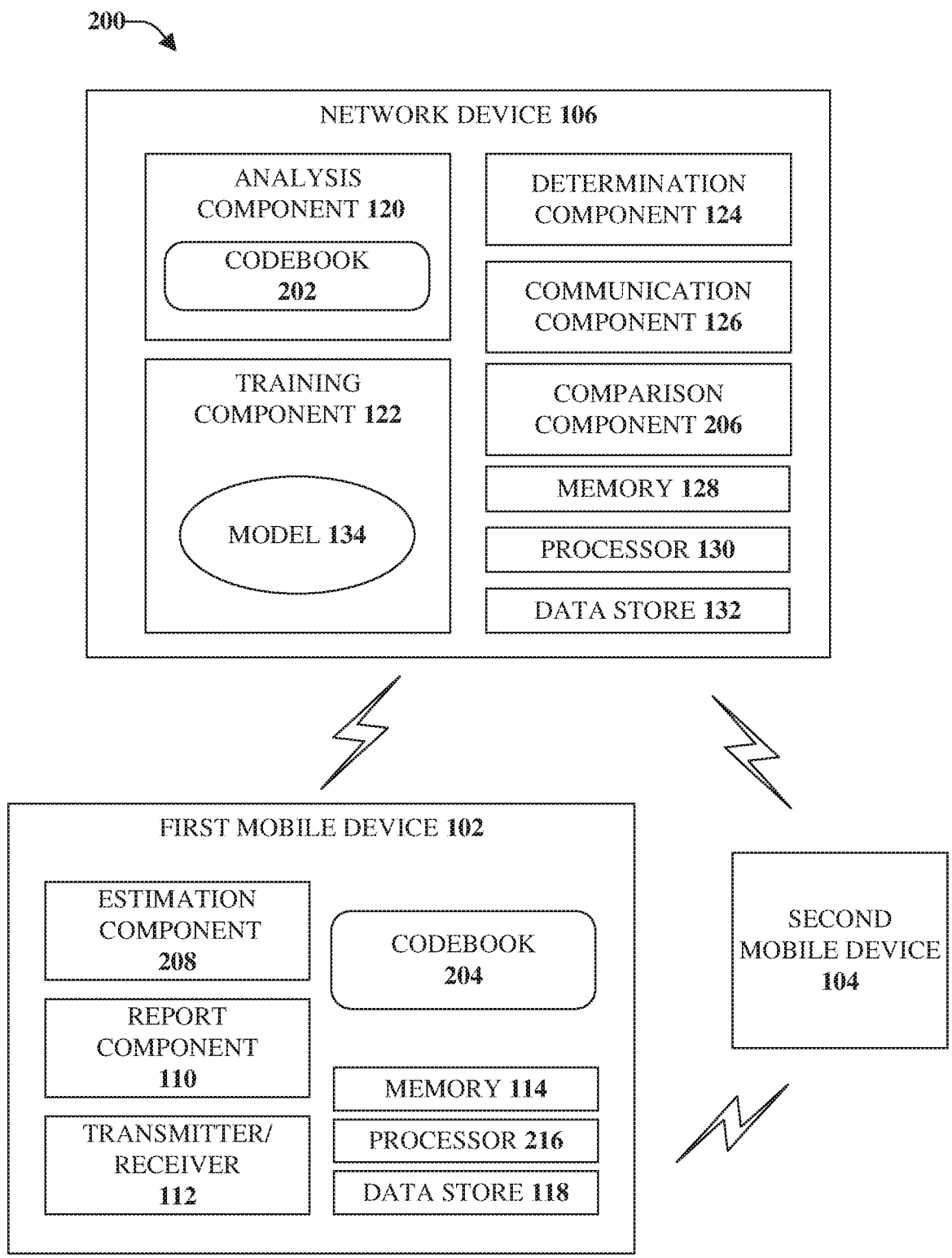
FIG. 2 illustrates an example, non-limiting, communications system for comparing unlink and downlink channel state information to facilitate generic reciprocity-based channel state information acquisition frameworks in accordance with one or more embodiments described herein.

FIG. 2 illustrates an example, non-limiting, communications system 200 for comparing unlink and downlink channel state information to facilitate generic reciprocity-based channel state information acquisition frameworks in accordance with one or more embodiments described herein. Repetitive description of like elements employed in other embodiments described herein is omitted for sake of brevity. The communications system 200 can comprise one or more of the components and/or functionality of the communications system 100, and vice versa.

CSI acquisition is key component of MIMO operation in any wireless system. Especially in LTE FD-MIMO and NR, the number of antenna ports is significant larger. As a result, the CSI feedback overhead also increases significantly. Conventionally, the channel reciprocity can be utilized to save CSI feedback overhead in a TDD system. Discussed herein is a generic reciprocity-based CSI acquisition scheme which is applicable to both a TDD system and an FDD system.

From a downlink RS, the first mobile device 102 can estimate the CSI (e.g., via the estimation component 108) and report the CSI to the network node device (e.g., the network device 106) using an uplink feedback channel or a data channel (e.g., via the report component 110 and the transmitter/receiver 112). The CSI can comprise one or more CRIs, one or more RIs, one or more CQIs, and/or one or more LIs.

The gNB (e.g., the network device 106) can estimate an uplink channel for the same mobile device (e.g., the first mobile device 102) based on uplink SRS (e.g., via the analysis component 120). For example, the estimated uplink channel can be quantized according to a codebook 202. Assuming the uplink channel is quantized as CSI-UL. According to some embodiments, the network device 106 can use a codebook 204 used by the mobile device to obtain PMI and the network device 106 can derive a PMI based on the uplink channel estimate. Thus, the codebook 202 and another codebook 204 utilized by the first mobile device 102 can be a same codebook. In accordance with other embodiments, the network device 106 can use the Singular Value Decomposition (SVD) of the channel estimate and can obtain the PMI which is closest to the SVD of the uplink channel matrix.

A comparison component 206 can compare the reported PMI as part of CSI from the first mobile device 102 and the computed PMI from CSI-UL. Further, the network device 106 (e.g., the gNB) can generate a database (e.g., the at least one data store 118 or another data store) with a mapping relationship between uplink CSI and downlink CSI.

Figure 3:
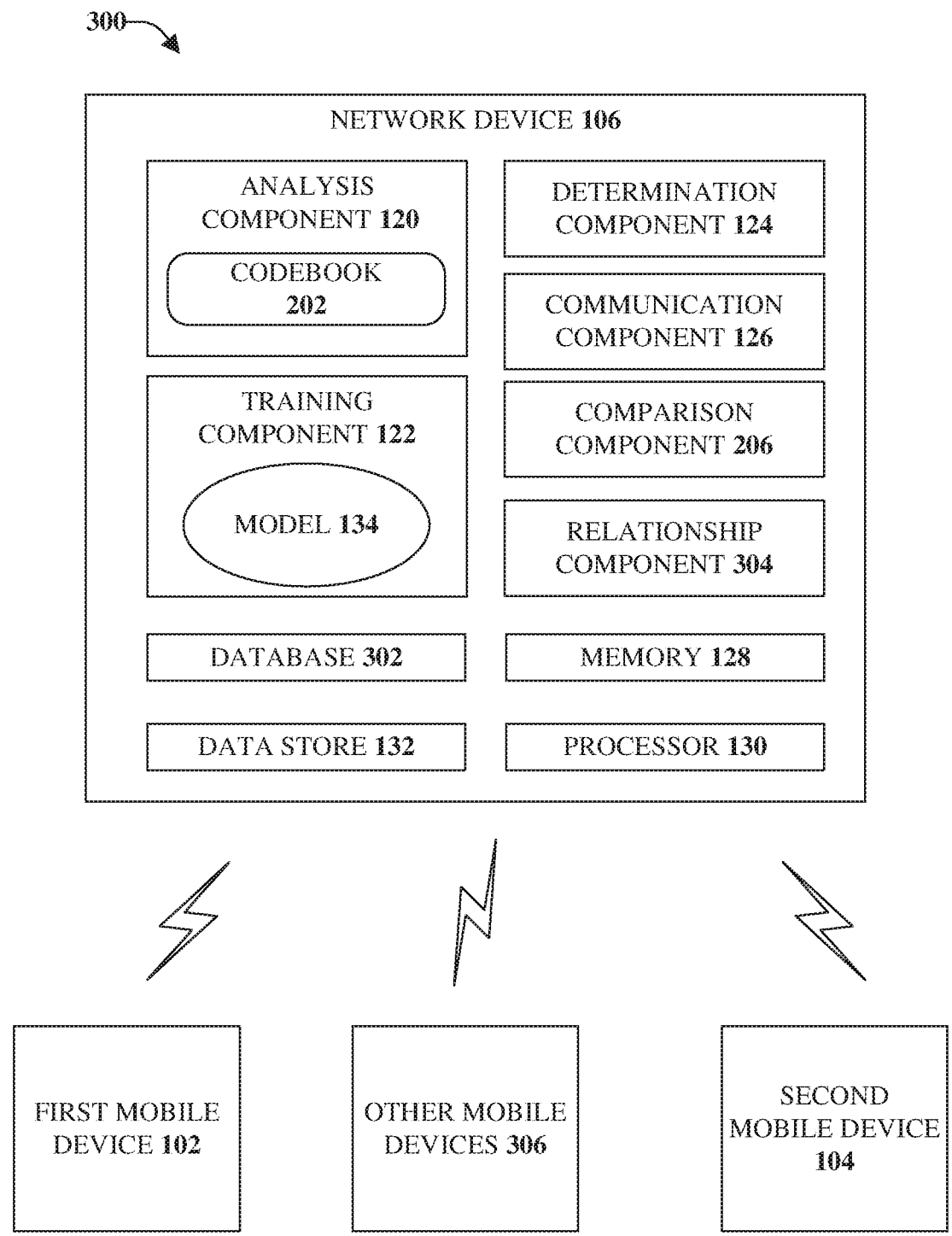
FIG. 3 illustrates an example, non-limiting, communications system for determining channel state information for mobile devices in a communications network while mitigating an amount of network traffic in accordance with one or more embodiments described herein.

FIG. 3 illustrates an example, non-limiting, communications system 300 for determining channel state information for mobile devices in a communications network while mitigating an amount of network traffic in accordance with one or more embodiments described herein. Repetitive description of like elements employed in other embodiments described herein is omitted for sake of brevity. The communications system 300 can comprise one or more of the components and/or functionality of the communications system 100, the communications system 200, and vice versa.

As mentioned, advanced networks can have a larger number of antenna elements inside one antenna. The channel itself can become a very large metric (M×N) due to the number of transmit antennas (M) and the number of receive antennas (N). If the transmit antennas become very large, then the metric itself scales proportionally (e.g., becomes very large).

Traditionally, there is a reciprocity-based framework where it is assumed that the uplink channel and the downlink channel are reciprocal. In this framework, the base station (e.g., the network device 106) directly estimates the uplink channel, then assumes it is the same estimation for the downlink channel. However, the issue is that this utilizes a difficult calculation process, referred to as a reciprocity calibration, in which the phase and transmission chain are the same for every antenna. However, it is expensive to establish a separate special antenna element and to perform this calibration procedure. Further, the calibration has to be performed on the fly because the phase of each antenna branch or each antenna transmission or receiving chain can change due to various conditions. For example, a calculation might need to be every 100 milliseconds, which can become expensive and computationally intensive.

Accordingly, the various aspects provided herein do not rely on the reciprocity calibration. Instead a certain amount of phase offset between the transmission chain and the receiving chain is accepted since it cannot be assumed that the channel received in the uplink is the same as the downlink. Instead, there will be some unknown offset, which will be transferred to the downlink channel Thus, instead of the tradition calibration process, which performs an estimation and transmits the uplink channel into a downlink channel, the disclosed aspects can be configured to build a database 302. According to some implementations, the database 302 can be included, at least partially, in the at least one data store 132. A one-to-one relationship between the uplink received channel, which can be quantified into the codebook 202, and then migrated to a downlink transmission precoder.

For example, the first mobile device 102 can receive bits and monitor information. Then the network device 106 can estimate the uplink channel at about the same time the first mobile device 102 is performing the measurement, based on uplink reference signals. Thereafter, the uplink estimated channel can be quantified and compared to the mobile device measured channel (e.g., via the analysis component 120). This can be used as input to a machine learning algorithm and a relationship component 304 can build a data mapping between the downlink channel and the uplink channel.

According to the various aspects discussed herein, one or two mobile devices (e.g., the first mobile device and the second mobile device 104) report respective downlink channel measurements. For example, the first mobile device 102 can report a first downlink channel measured at the first mobile device 102, and the second mobile device 104 can report a second downlink channel measured at the second mobile device 104. The measurements reported by the first mobile device 102 and the second mobile device 104 are utilized by the training component 122 to train the model 134. Upon or after training the model 134, the information in the database 302 can be applied to the remainder of the mobile devices (e.g., the other mobile devices 306) in the communications network. In contrast, in a conventional framework, every mobile device provides feedback, which increases an amount of network traffic.

According to some implementations, a format of CSI and CSI-UL can be covariance matrix, effective downlink precoder, and so on. In an example, the database generation can be based on machine learning (e.g. a Wiener filter can help to find the mapping relationship between downlink and uplink CSI).

To reduce the complexity, in some embodiments, the network device 106 can use the database to generate downlink precoder based on uplink channel estimation for the other mobile devices 306. In other embodiments the network device 106 can estimate the uplink channel and compare the reported PMI and generate the database for individual mobile and uses its own data base (e.g., the database 302).

By way of example and not limitation, an application example of this framework can be GoB beamforming. For example, a CSI format can be precoder (PMI feedback) based on a certain codebook. The uplink CSI can be the effective downlink precoder. The uplink CSI can be based on received uplink SRS, and the network device 106 can estimate the covariance matrix of uplink channel. Further, the network device 106 can quantize the precoder according to the same codebook used for mobile device's PMI report. Thereafter, the index of selected DFT beam can be derived from the downlink PMI and the uplink PMI. The database can capture the mapping between the beam indexes of uplink CSI and downlink CSI. As the selected DFT beam is associated with angle of signal arrival, this database essentially captures the offset relationship between the downlink transmission and uplink reception. For other mobile devices, the network device 106 can estimate uplink channel based on SRS, then quantize the channel based on the codebook. Then the network device 106 can use the DFT beam index to look up the database to find the corresponding downlink DFT beam index. Based on this, the network device 106 can obtain the reciprocity-based CSI.

Figure 4:
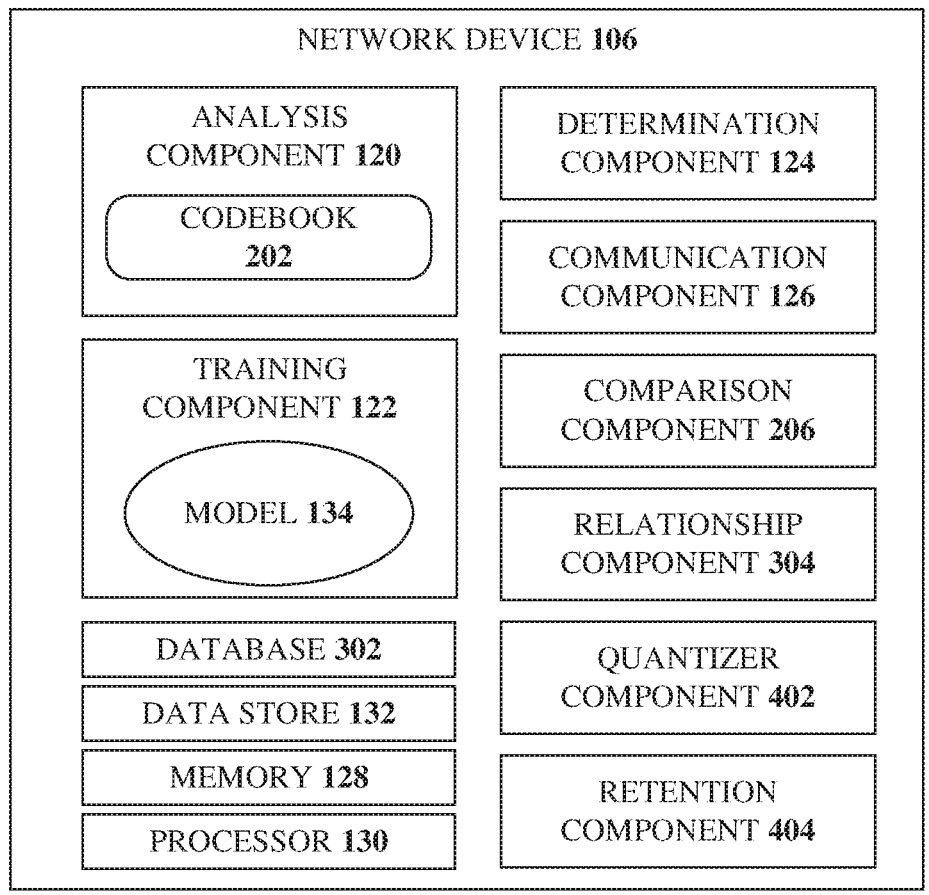
FIG. 4 illustrates an example, non-limiting, communications system for providing generic reciprocity in accordance with one or more embodiments described herein.
Figure 4:
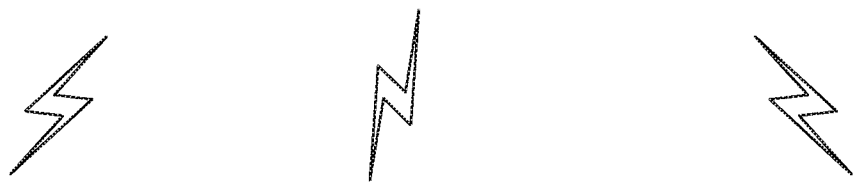

FIG. 4 illustrates an example, non-limiting, communications system 400 for providing generic reciprocity in accordance with one or more embodiments described herein. Repetitive description of like elements employed in other embodiments described herein is omitted for sake of brevity. The communications system 400 can comprise one or more of the components and/or functionality of the communications system 100, the communications system 200, the communications system 300, and vice versa.

Provided herein is a reciprocity CSI process procedure. According to various aspects, a database can be constructed to track the downlink and uplink CSI difference. The database construction can be based on an over-the-air calibration process which compare the reported CSI and uplink CSI.

Current CSI feedback framework is based on mobile device feedback. For example, type-2 CSI feedback is based on linear combination with sub-band phase and amplitude adjustment for each selected beam. The feedback overhead can easily reach over 100 bits for each report. That can impose huge challenges on the uplink feedback channel design. On the other hand, CRI based feedback allows mobile devices to select one out of several precoded CSI-RS resources, where each represents a beam. How the basestation obtains the precoder for those CSI-RS resources is unknown. So, effectively, in an FDD system, there is no other choice than having a large number of feedback bits to obtain the fine granular CSI at gNB side.

The framework provided herein is a generic procedure to obtain the downlink uplink calibration. For example, based on one mobile device's CSI feedback, the network can estimate the CSI offset between uplink and downlink, then apply the offset to other mobile devices. In practice, the downlink CSI and uplink CSI can be quantized based on the same format. The offset between downlink CSI and uplink CSI can be used to construct the database. Also, multiple mobile devices can participate in the construction of this database which can help to reduce the impairment of the database construction. Significant gains can be obtained at the link and system level as the complete channel information is known at the transmitter even for FDD systems. The network can configure the CSI reporting less frequent thereby reducing the feedback channel overhead from the mobile device. Hence these resources can be used for data traffic channel, thereby increasing the capacity for uplink.

The analysis component 120 can determine, for a first mobile device (e.g., the first mobile device 102) selected from a group of mobile devices (e.g., the second mobile device 104, the other mobile devices 306) in a wireless network, first uplink channel state information based on first downlink channel state information received from the first mobile device. In some implementations, a quantizer component 402 can quantize the first uplink channel state information based on a codebook (e.g., the codebook 204) utilized by the first mobile device to determine the first downlink channel state information.

A data store (e.g., the at least one data store 132, the database 302) can be populated, via a retention component 404, with information indicative of differences between the first downlink channel state information and the first uplink channel state information. For example, the retention component 404 can store the first uplink channel state information, the first downlink channel state information, and the information indicative of differences in the data store as a one-to-one mapping relationship.

The training component 122 can train the model 134 on the information indicative of the differences to a defined confidence level. According to some implementations, machine learning can be implemented to train the model on the information indicative of differences between the first downlink channel state information and the first uplink channel state information. Further to these implementations, the model can be utilized to determine the second uplink channel state information.

In some aspects, the communications system 400 can perform a set of machine learning computations associated with training a model. For example, the communications system 400 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to train the model. Further details related to the machine learning aspects with be discussed below with respect to FIG. 5.

The determination component 124 can determine, for a second mobile device (e.g., the second mobile device 104) in the group of mobile devices, second uplink channel state information based on the model. Downlink channel state information is not received from the second mobile device. Accordingly, network traffic can be reduced and/or mitigated in accordance with the various aspects provided herein.

Figure 5:
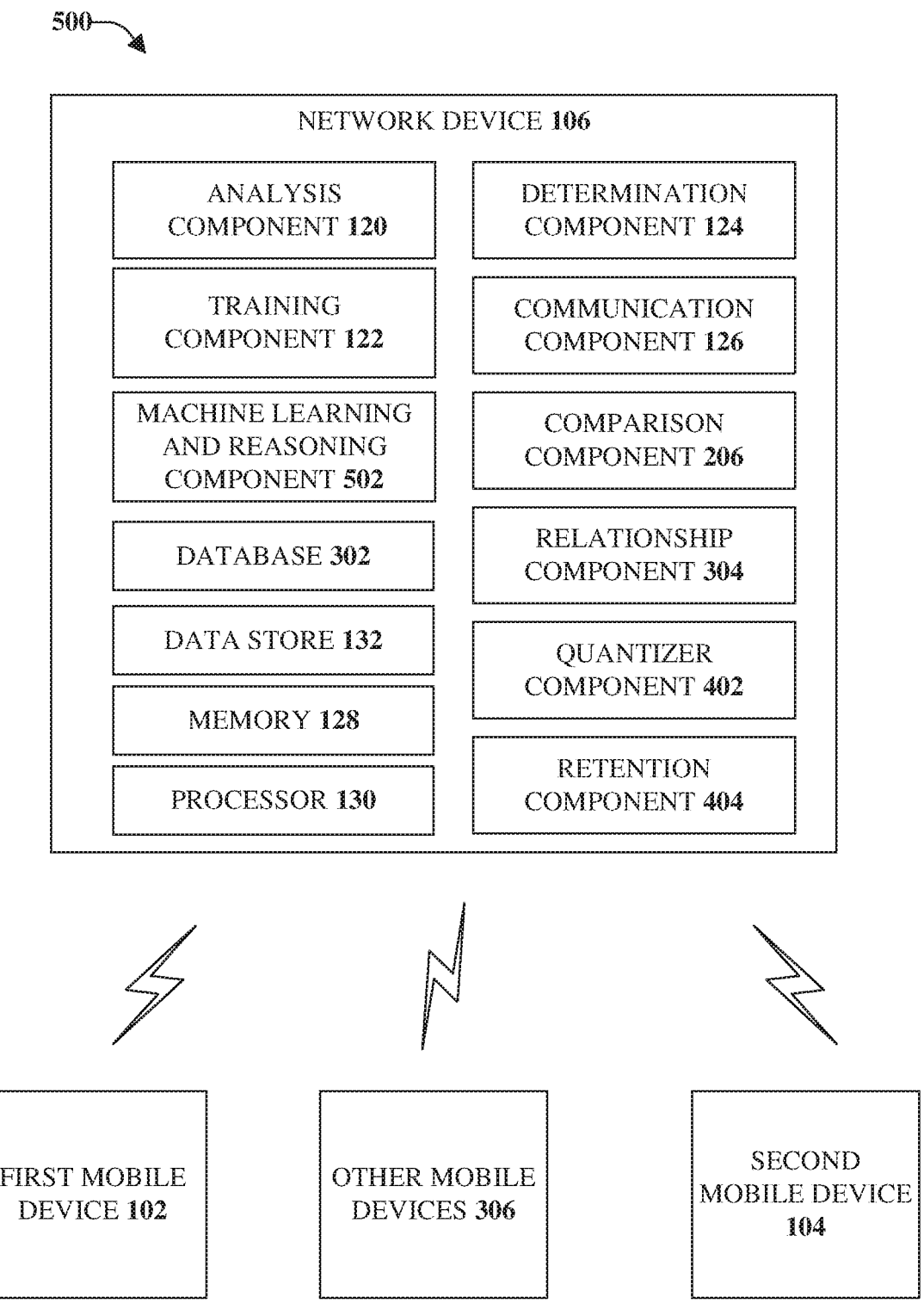
FIG. 5 illustrates an example, non-limiting, communications system that employs automated learning to facilitate one or more of the disclosed aspects in accordance with one or more embodiments described herein.

FIG. 5 illustrates an example, non-limiting, communications system 500 that employs automated learning to facilitate one or more of the disclosed aspects in accordance with one or more embodiments described herein. Repetitive description of like elements employed in other embodiments described herein is omitted for sake of brevity. The communications system 500 can comprise one or more of the components and/or functionality of the communications system 100, the communications system 200, the communications system 300, the communications system 400, and vice versa.

As illustrated, the communications system 500 can comprise a machine learning and reasoning component 502 that can be utilized to automate one or more of the disclosed aspects. The machine learning and reasoning component 502 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 can employ principles of probabilistic and decision theoretic inference. Additionally, or alternatively, the machine learning and reasoning component 502 can rely on predictive models constructed using machine learning and/or automated learning procedures. Logic-centric inference can also be employed separately or in conjunction with probabilistic methods.

The machine learning and reasoning component 502 can infer which uplink channel state information should be selected for use with a particular reported downlink channel state information, which uplink channel state information should be selected for mobile devices from which downlink channel state information is not received, and so on. Such inference can be performed by the machine learning and reasoning component 502 by obtaining knowledge about the reported channel state information, associated environmental conditions, associated channel conditions, associated mobile device information, and other information that would be useful by the network device 106 to perform over-the-air calibration of the first mobile device 102. The inference can be performed at about the same time as reported downlink channel state information is received at the network device 106 (e.g., via the transmitter/receiver 112).

Based on this knowledge, the machine learning and reasoning component 502 can make an inference based on which uplink channel state information should be defined for one or more mobile devices (e.g., the first mobile device 102, the second mobile device 104, and/or other mobile devices).

As used herein, the term "inference" refers generally to the process of reasoning about or inferring states of a system, a component, a module, an environment, and/or devices from a set of observations as captured through events, reports, data and/or through other forms of communication. Inference can be employed to identify a specific context or information, or can generate a probability distribution over states, for example. The inference can be probabilistic. For example, computation of a probability distribution over states of interest based on a consideration of data and/or conditions. The inference can also refer to techniques employed for composing higher-level information from a set of conditions and/or data. Such inference can result in the construction of new conditions and/or actions from a set of observed conditions and/or stored conditions data, whether or not the conditions are correlated in close temporal proximity, and whether the conditions and/or data come from one or several conditions and/or data sources. Various classification procedures and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with the selection of uplink channel state information, evaluation of network conditions and/or device conditions, and so forth) can employ various artificial intelligence-based procedures for carrying out various aspects thereof.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to identify differences between reported and determined channel state information and which channel state information should be selected from a group of channel state information at a particular moment in time (e.g., at about the same time as reported channel state information is received from the network device 106).

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing channel conditions, by receiving extrinsic information about what is needed by the network device 106 to perform over-the-air calibration, and so on). For example, SVM's can be configured through a learning or training phase within a classifier constructor and feature selection module. Thus, a classifier(s) can be used to automatically learn and perform a number of functions, including, but not limited to, determining according to a predetermined criterion when to select a particular channel state information, when to exclude information, and so forth. The criteria can include, but is not limited to, similar conditions, historical information, and so forth.

Additionally, or alternatively, an implementation procedure (e.g., a rule, a policy, and so on) can be applied to control and/or regulate information in order to mitigate an amount of unnecessary overhead, and so forth. In some implementations, based upon a predefined criterion, the rules-based implementation can automatically and/or dynamically calibrate one or more mobile devices. In response thereto, the rule-based implementation can automatically interpret and carry out functions associated with the conditions by employing a predefined and/or programmed rule(s) based upon any desired criteria.

Advantages of the disclosed aspects include, but are not limited to, providing a generic reciprocity-based CSI acquisition framework that comprises a generic procedure to obtain the downlink uplink calibration. Based on one mobile device's CSI feedback, the network device can estimate the CSI offset between uplink and downlink, then apply the offset to other mobile devices. In practice, the downlink CSI and uplink CSI can be quantized based on the same format. The offset between downlink CSI and uplink CSI can be used to construct the database. Also, multiple mobile devices can participate to the construction of this database, which can help to reduce and/or mitigate the impairment of the database construction. In addition, significant gains can be obtained at the link and system level as the complete channel information is known at the transmitter, even for FDD systems. Further, the network device can configure the CSI reporting less frequently thereby reducing the feedback channel overhead from the mobile device. Hence these resources can be used for data traffic channel, thereby increasing the capacity for uplink resources.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
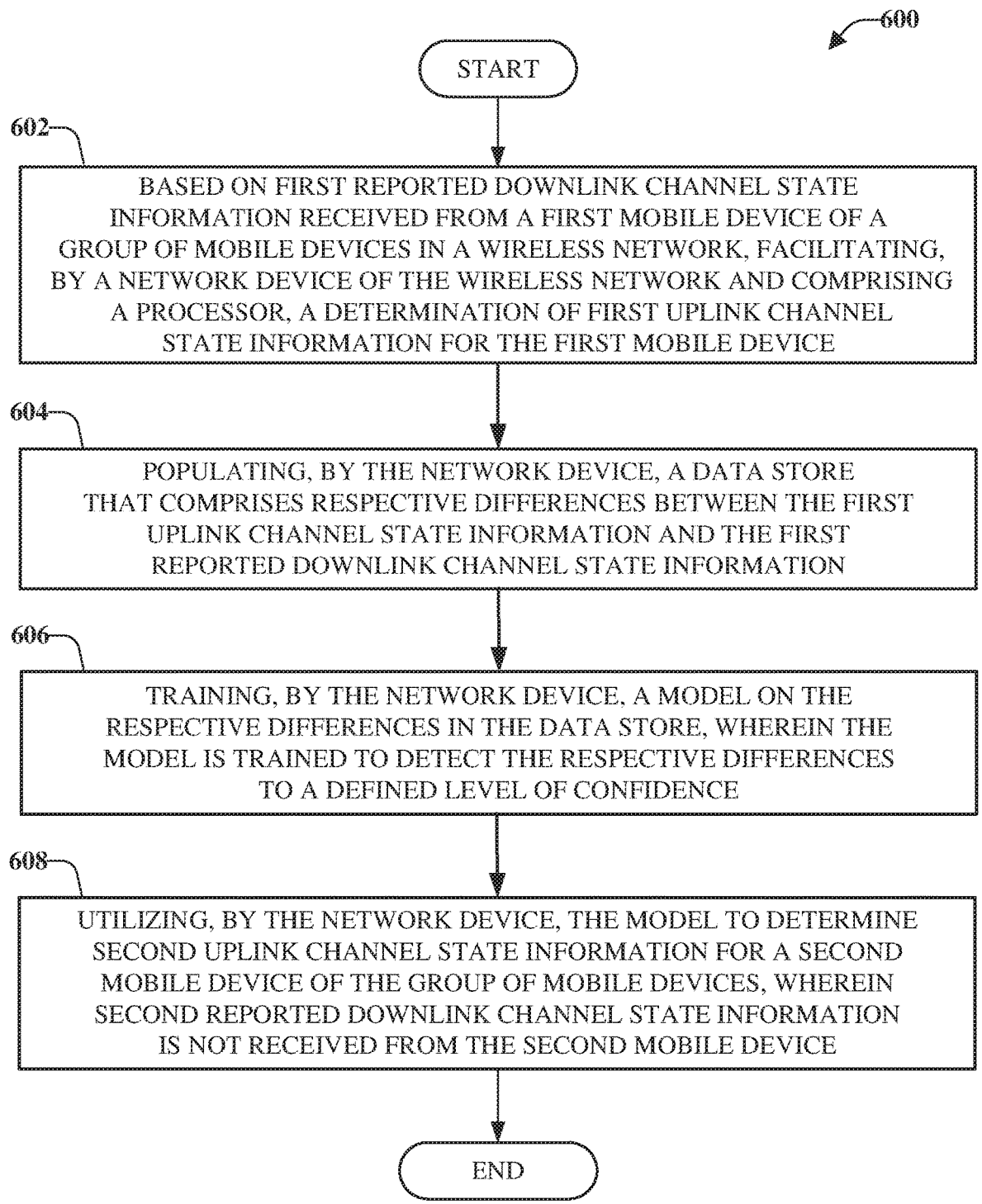
FIG. 6 illustrates an example, non-limiting, method for generic reciprocity-based channel state information acquisition frameworks in accordance with one or more embodiments described herein.

FIG. 6 illustrates an example, non-limiting, method 600 for generic reciprocity-based channel state information acquisition frameworks in accordance with one or more embodiments described herein. Repetitive description of like elements employed in other embodiments described herein is omitted for sake of brevity. The method 600 can be implemented by a network device of a wireless network, the network device comprising a processor. Alternatively, or additionally, a machine-readable storage medium can comprise executable instructions that, when executed by a processor, facilitate performance of operations for the method 600.

The method 600 starts, at 602, with facilitating a determination of first uplink channel state information for a first mobile device (e.g., via the analysis component 120). The determination can be based on first reported downlink channel state information received from a first mobile device of a group of mobile devices in a wireless network. A data store can be populated, at 604, with respective differences between the first uplink channel state information and the first reported downlink channel state information (e.g., via the retention component 404).

In accordance with some implementations, determining first uplink channel state information can comprise estimating a spatial domain portion of the channel comprising a main signal transmitting angle. In additional, or alternative, implementations, determining first uplink channel state information can comprise estimating a spatial domain portion of the channel comprising a main signal receiving angle.

Further, at 606, a model can be trained on the respective differences in the data store (e.g., via the training component 122). According to some implementations, the model can be trained to detect the respective differences to a defined level of confidence.

The model can be used, at 608, to determine second uplink channel state information for a second mobile device of the group of mobile devices (e.g., via the determination component 124). Second reported downlink channel state information is not received from the second mobile device.

Figure 7:
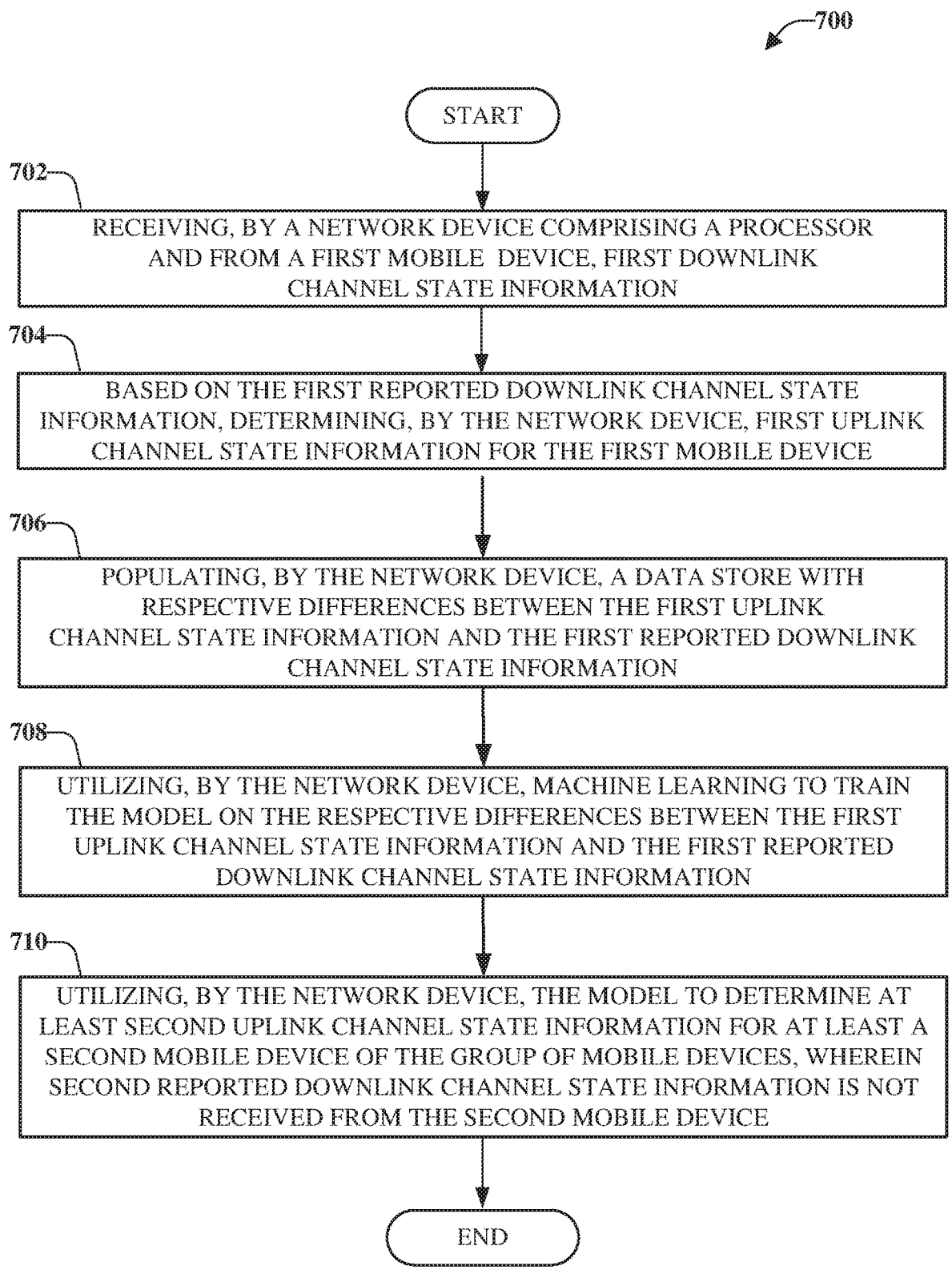
FIG. 7 illustrates an example, non-limiting, method for utilizing machine learning to facilitate generic reciprocity-based channel state information acquisition frameworks in accordance with one or more embodiments described herein.

FIG. 7 illustrates an example, non-limiting, method 700 for utilizing machine learning to facilitate generic reciprocity-based channel state information acquisition frameworks in accordance with one or more embodiments described herein. Repetitive description of like elements employed in other embodiments described herein is omitted for sake of brevity. The method 700 can be implemented by a network device of a wireless network, the network device comprising a processor. Alternatively, or additionally, a machine-readable storage medium can comprise executable instructions that, when executed by a processor, facilitate performance of operations for the method 700.

A first downlink channel state information can be received from a first mobile device in a wireless communications network, at 702 (e.g., via the communications component 126). The first mobile device can be a mobile device selected from a group of mobile devices in the wireless communications network. Further, downlink CSI information is not received from the other devices in the wireless communications network.

Based on the first reported downlink channel state information, at 704, a determination of first uplink channel state information for the first mobile device can be performed (e.g., via the analysis component 120). A data store can be populated, at 706, with respective differences between the first uplink channel state information and the first reported downlink channel state information (e.g., via the retention component 404).

At 708, machine learning can be utilized to train the model on the respective differences between the first uplink channel state information and the first reported downlink channel state information (e.g., via the training component 122 or the machine learning and reasoning component 502). For example, the model can be trained on the respective differences in the data store, wherein the model is trained to detect the respective differences to a defined level of confidence.

Further, the model can be utilized, at 710 to determine at least a second uplink channel state information for at least a second mobile device of the group of mobile devices (e.g., via the determination component 124). At least the second uplink channel state information can be determined without receipt of a second reported downlink channel state information from the second mobile device.

Figure 8:
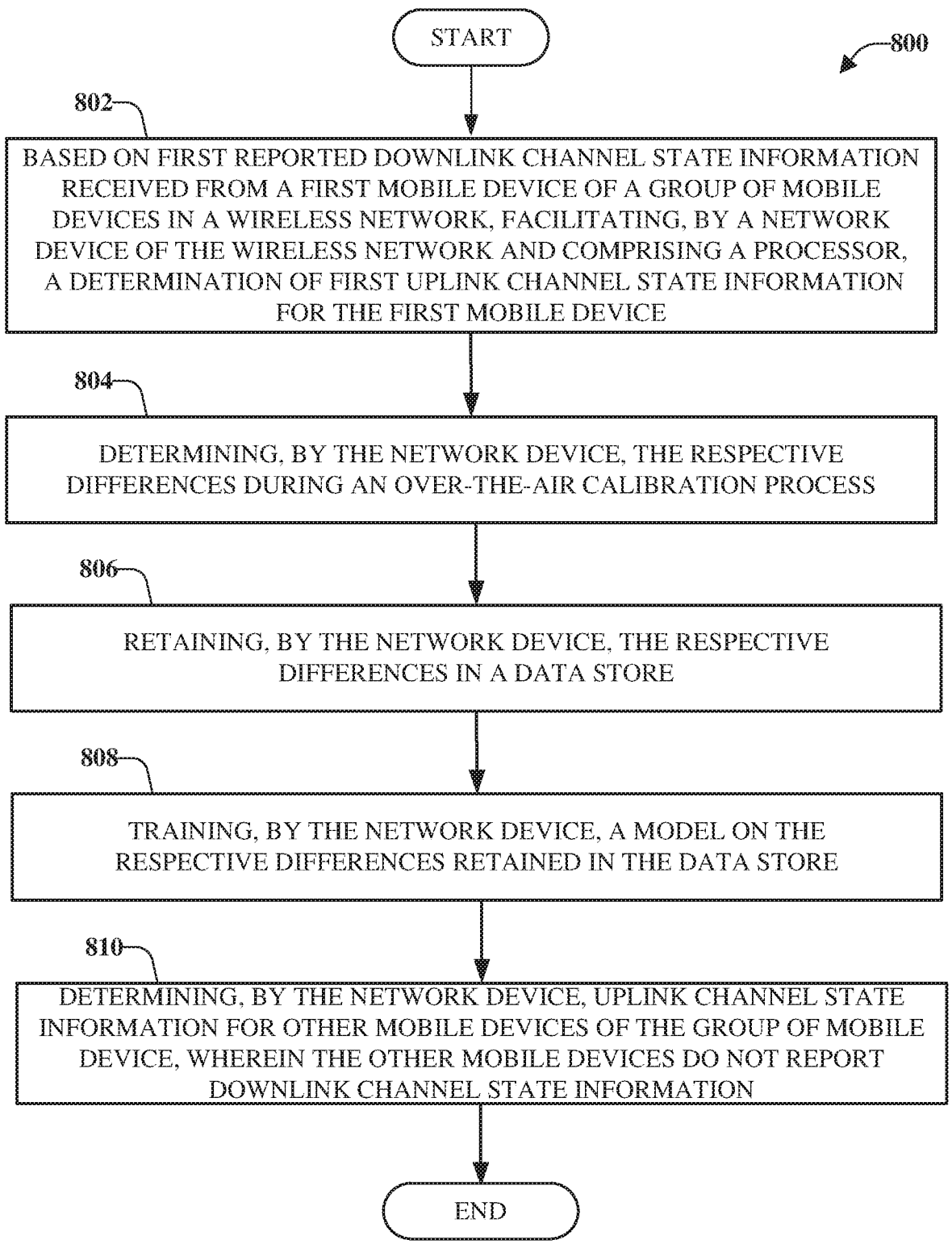
FIG. 8 illustrates an example, non-limiting, method for utilizing machine learning to facilitate retaining a one-to-one mapping relationship between uplink channel state information and reported downlink channel state information in accordance with one or more embodiments described herein.

FIG. 8 illustrates an example, non-limiting, method 800 for utilizing machine learning to facilitate retaining a one-to-one mapping relationship between uplink channel state information and reported downlink channel state information in accordance with one or more embodiments described herein. Repetitive description of like elements employed in other embodiments described herein is omitted for sake of brevity. The method 800 can be implemented by a network device of a wireless network, the network device comprising a processor. Alternatively, or additionally, a machine-readable storage medium can comprise executable instructions that, when executed by a processor, facilitate performance of operations for the method 800.

Based on a first reported downlink channel state information received from a first mobile device of a group of mobile devices in a wireless network, at 804, the method 800 can facilitate a determination of first uplink channel state information for the first mobile device (e.g., via the analysis component 120). Differences between the first uplink channel state information and the reported downlink channel state information can be determined at 804 (e.g., via the determination component 124). According to some implementations, the differences can be determined during an over-the-air calibration process.

The differences can be retained in a data store, at 806 (e.g., via the retention component 404). For example, the data store can be populated with the respective differences between the first uplink channel state information and the first reported downlink channel state information. According to some implementations, retaining the differences in the data store can comprise facilitating a mitigation of an amount of network traffic within the wireless network as compared to the second mobile device providing the second reported downlink channel state information.

A model can be trained on the differences, at 808 (e.g., via the training component 122). For example, the model can be trained to detect the differences to a defined confidence level. The model can be used, at 810, to determine uplink channel state information for other mobile devices of the group of mobile devices that do not report downlink channel state information (e.g., via the determination component 124). Determining the uplink channel state information for the other mobile devices can facilitate a mitigation of an amount of network traffic within the wireless network as compared to the other mobile devices reporting downlink channel state information.

Described herein are systems, methods, articles of manufacture, and other embodiments or implementations that can facilitate generic reciprocity-based channel state information acquisition frameworks for advanced networks. Facilitating generic reciprocity-based channel state information acquisition frameworks for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
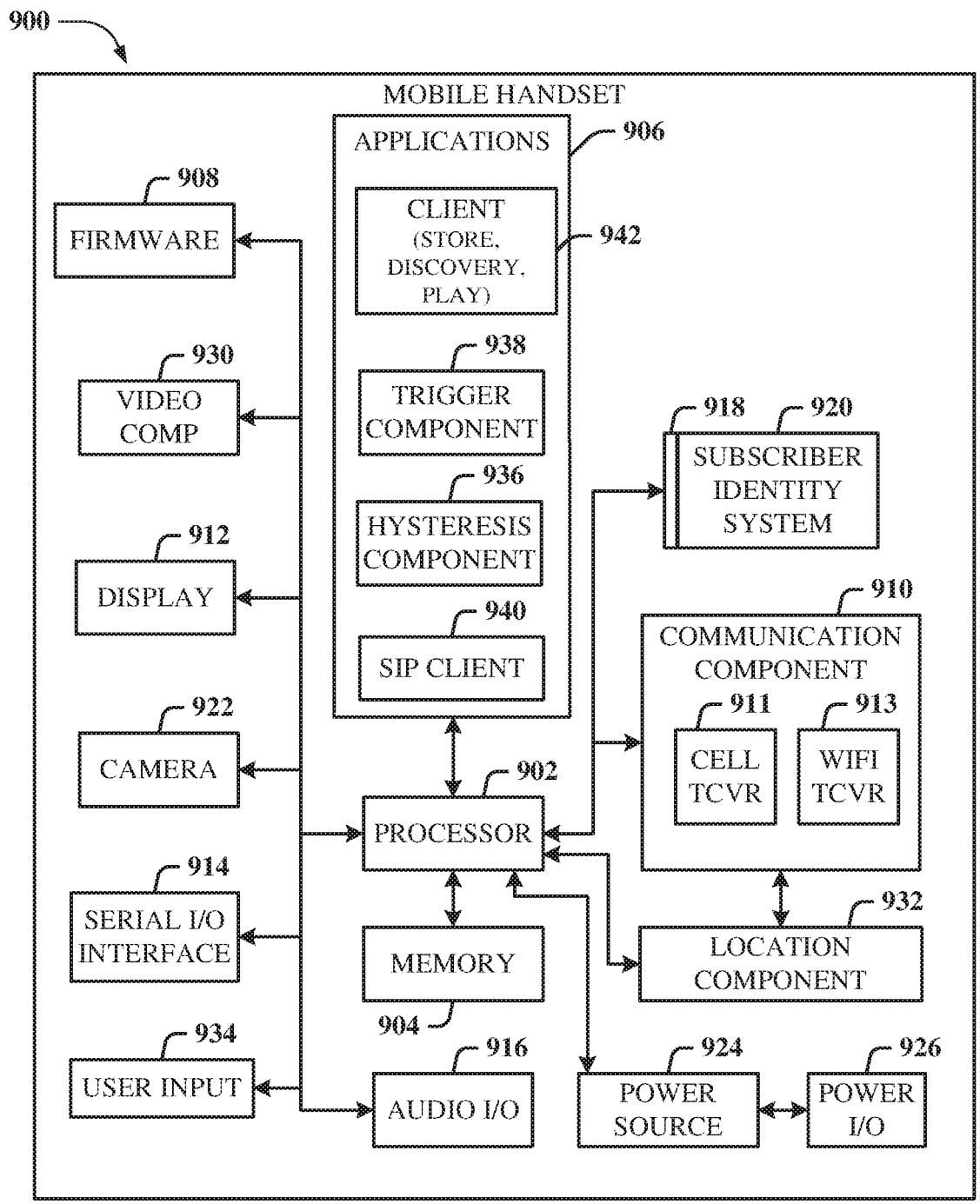
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
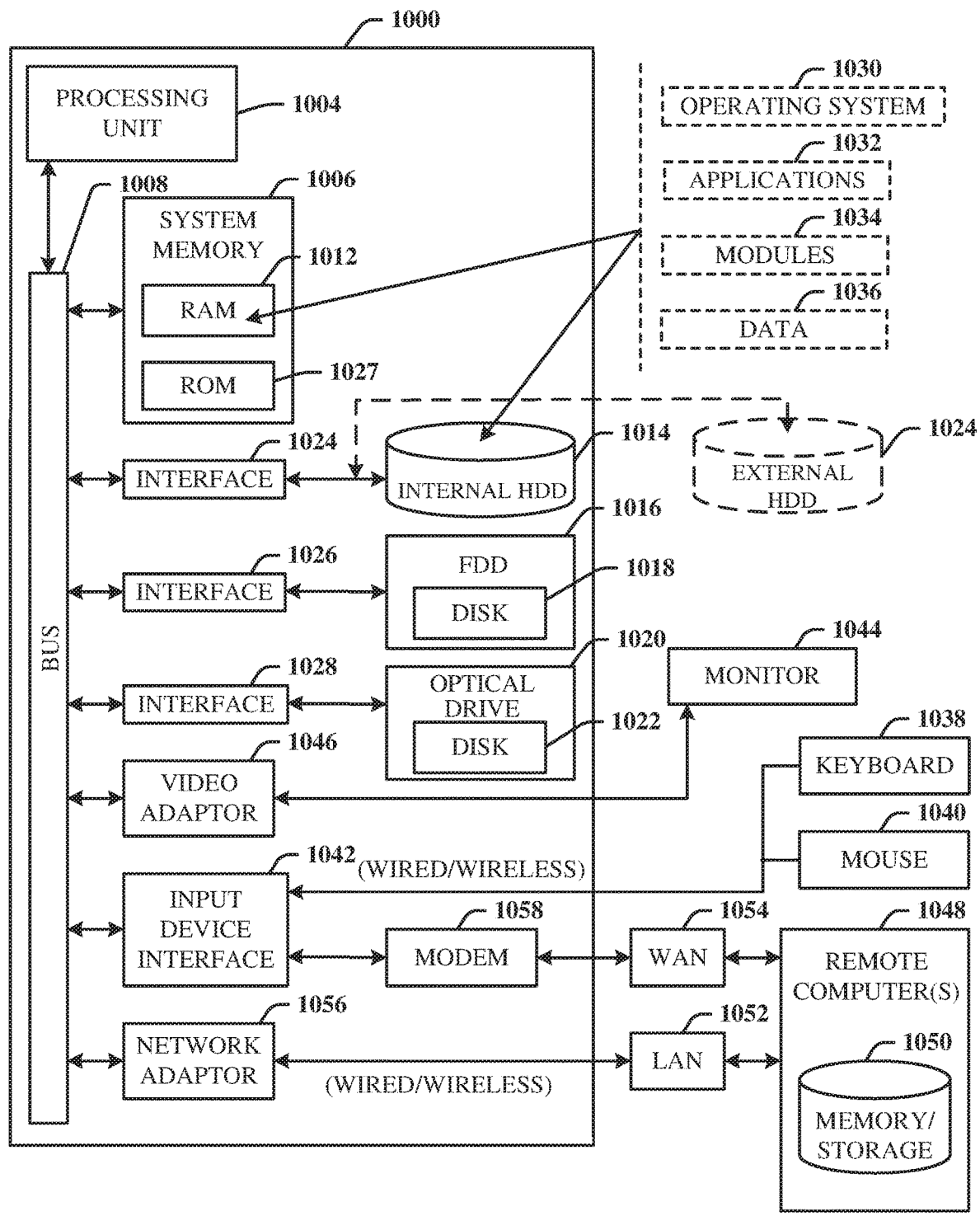
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   training, by a network device, a model based on information indicative of differences between first downlink channel state information and first uplink channel state information of a first mobile device, wherein the network device comprises a processor and a memory; and
   in absence of receiving second downlink channel state information from a second mobile device, using, by the network device, the model to determine second uplink channel state information for the second mobile device.

2. The method of claim 1, further comprising:
   prior to the training of the model, populating, by the network device, a data store with the information indicative of the differences between the first downlink channel state information and the first uplink channel state information.

3. The method of claim 2, further comprising:
   storing, by the network device, the first uplink channel state information, the first downlink channel state information, and the information indicative of the differences between the first downlink channel state information and the first uplink channel state information in the data store as a one-to-one mapping relationship.

4. The method of claim 1, further comprising:
implementing, by the network device, machine learning to train the model based on the information indicative of differences between the first downlink channel state information and the first uplink channel state information.

5. The method of claim 1, further comprising:
prior to the training of the model, determining, by the network device, the first uplink channel state information based on the first downlink channel state information received from the first mobile device.

6. The method of claim 5, wherein the determining of the first uplink channel state information comprises quantizing the first uplink channel state information based on a codebook utilized by the first mobile device to determine the first downlink channel state information.

7. The method of claim 5, wherein the determining of the first uplink channel state information comprises estimating a spatial domain portion of a channel comprising a main signal receiving angle.

8. The method of claim 5, wherein the determining of the first uplink channel state information comprises estimating a spatial domain portion of a channel comprising a main signal transmitting angle.

9. The method of claim 5, wherein the determining of the first uplink channel state information comprises comparing the first downlink channel state information and the first uplink channel state information during an over-the-air calibration process.

10. The method of claim 1, wherein the first downlink channel state information comprises a reported pre-coding matrix indicator, and wherein the first uplink channel state information comprises a determined pre-coding matrix indicator.

11. The method of claim 10, further comprising:
comparing, by the network device, the reported pre-coding matrix indicator and the determined pre-coding matrix indicator.

12. A system, comprising:
a processor; and
a memory that stores executable instructions that, when executed by the processor, facilitate performance of operations, comprising:
training a model on respective differences between a first uplink channel state information and a first downlink channel state information reported by a first device; and
based on second reported downlink channel state information not being received from a second device, utilizing the model to determine second uplink channel state information for the second device.

13. The system of claim 12, wherein the operations further comprise:
based on the utilizing of the model to determine the second uplink channel state information, facilitating a mitigation of an amount of network traffic within a wireless network as compared to the second device providing the second reported downlink channel state information.

14. The system of claim 12, wherein the training of the model comprises utilizing machine learning to train the model on the respective differences between the first uplink channel state information and the first downlink channel state information.

15. The system of claim 12, wherein the operations further comprise:
determining the respective differences during an over-the-air calibration process.

16. The system of claim 12, wherein the operations further comprise:
populating a data store that comprises the respective differences between the first uplink channel state information and the first downlink channel state information.

17. The system of claim 16, wherein the operations further comprise:
facilitating a one-to-one mapping relationship between the first uplink channel state information and the first downlink channel state information based on the respective differences.

18. A machine-readable storage medium, comprising executable instructions that, when executed by a processor, facilitate performance of operations, comprising:
training a model using, as input, a difference between first downlink channel state information and first uplink channel state information received from a first user equipment; and
without receipt of second downlink channel state information from a second user equipment, employing the model to determine second uplink channel state information for the second user equipment.

19. The machine-readable storage medium of claim 18, wherein the operations further comprise:
comparing the first downlink channel state information and the first uplink channel state information during an over-the-air calibration process, wherein the first downlink channel state information comprises a first reported pre-coding matrix indicator, and wherein the first uplink channel state information comprises a first computed pre-coding matrix indicator.

20. The machine-readable storage medium of claim 18, wherein the operations further comprise:
employing the model to determine third uplink channel state information for a third user equipment, and wherein third downlink channel state information is not received from the third user equipment.

* * * * *